US012809957B2

(12) United States Patent
Robinson-Morgan et al.

(10) Patent No.: US 12,809,957 B2
(45) Date of Patent: Nov. 24, 2026

(54) SYSTEMS AND METHODS FOR USE IN ALTERING ATTRIBUTES OF USER IDENTITIES ON NETWORKS

(71) Applicant: MASTERCARD INTERNATIONAL INCORPORATED, Purchase, NY (US)

(72) Inventors: Bryn Anthony Robinson-Morgan, Mosborough Village (GB); Liang Tian, Rye Brook, NY (US); Prashant Sharma, Madison, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 711 days.

(21) Appl. No.: 17/863,108

(22) Filed: Jul. 12, 2022

(65) Prior Publication Data

US 2023/0026228 A1 Jan. 26, 2023

Related U.S. Application Data

(60) Provisional application No. 63/221,397, filed on Jul. 13, 2021.

(51) Int. Cl.
*G06F 21/32* (2013.01)
*H04L 67/306* (2022.01)

(52) U.S. Cl.
CPC ............ *G06F 21/32* (2013.01); *H04L 67/306* (2013.01)

(58) Field of Classification Search
CPC ................................ G06F 21/32; H04L 6/306
See application file for complete search history.

(56) References Cited

U.S. PATENT DOCUMENTS

| | | | | |
|---|---|---|---|---|
| 9,137,257 | B2 * | 9/2015 | Shuster | H04L 63/1483 |
| 11,921,575 | B1 * | 3/2024 | Shoemaker | G06F 11/1479 |
| 2007/0170247 | A1 * | 7/2007 | Friedman | G06Q 20/42 235/379 |
| 2009/0106433 | A1 * | 4/2009 | Knouse | H04L 63/0815 709/229 |
| 2011/0208778 | A1 * | 8/2011 | Mellmer | G06F 21/6245 707/783 |

(Continued)

FOREIGN PATENT DOCUMENTS

KR 10-2008-0067641 7/2008

*Primary Examiner* — Luu T Pham
*Assistant Examiner* — Paul J Skwierawski
(74) *Attorney, Agent, or Firm* — Harness, Dickey & Pierce, P.L.C.

(57) ABSTRACT

Systems and methods are provided for changing attributes of user identities based on event driven rules. One example computer-implemented method includes receiving, at a computing device, from a mobile device, identification information associated with enrollment of an identity attribute of a user to a digital identity for the user and also receiving, from the mobile device, a request for a change to the identity attribute of the digital identity of the user. The method also includes determining a rule applicable to the change of the identity attribute based on a type of the identity attribute and/or a source of the identity attribute and determining whether the change to the at least one identity attribute is consistent with the rule. And, the method then includes effecting the change to the at least one identity attribute, when the change is consistent with the rule.

8 Claims, 4 Drawing Sheets

(56) References Cited

U.S. PATENT DOCUMENTS

| | | | | |
|---|---|---|---|---|
| 2015/0095987 | A1* | 4/2015 | Potash | H04L 63/08 726/4 |
| 2017/0132428 | A1 | 5/2017 | Kirigin et al. | |
| 2018/0196963 | A1* | 7/2018 | Bandiwdekar | G06F 21/6245 |
| 2019/0245693 | A1* | 8/2019 | Iyer | H04L 9/3231 |
| 2020/0364328 | A1* | 11/2020 | Hutchinson | G06F 21/31 |
| 2022/0319219 | A1* | 10/2022 | Tsibulevskiy | G06F 18/40 |

* cited by examiner

SYSTEMS AND METHODS FOR USE IN ALTERING ATTRIBUTES OF USER IDENTITIES ON NETWORKS

CROSS-REFERENCE TO RELATED APPLICATION

This application claims the benefit of, and priority to, U.S. Provisional Application No. 63/221,397, filed Jul. 13, 2021. The entire disclosure of the above application is incorporated herein by reference.

FIELD

The present disclosure is generally directed to systems and methods for use in altering attributes of user identities on networks, and in particular, to systems and methods for use in modeling rules associated with altering the attributes of the user identities.

BACKGROUND

This section provides background information related to the present disclosure which is not necessarily prior art.

In various networks, user identities of users are often required to be verified in order for the users to interact with different entities associated with the networks. For example, different entities typically require the identities of users to be verified prior to issuing accounts to the users. Such verification generally serves to protect the entities (e.g., financial institutions, etc.) from loss, as well as from liability related to know-your-customer (KYC) requirements (e.g., related to anti-money laundering requirements, etc.). In connection therewith, the entities may rely on presentment of physical documents (e.g., driver's licenses, passports, government ID cards, etc. that include one or more identity attributes of the users), by the users, as means of verifying the users (and their identities).

It is further known for users to be associated with digital identities, whereby the users may be verified (e.g., assessed, authenticated, etc.) without presenting physical documents to the entities associated with the networks. The digital identities, much like physical documents, include certain attributes about the users, and are issued by identity providers upon verification of the users (and their identities).

DRAWINGS

The drawings described herein are for illustrative purposes only of selected embodiments and not all possible implementations, and are not intended to limit the scope of the present disclosure.

Figure 1:
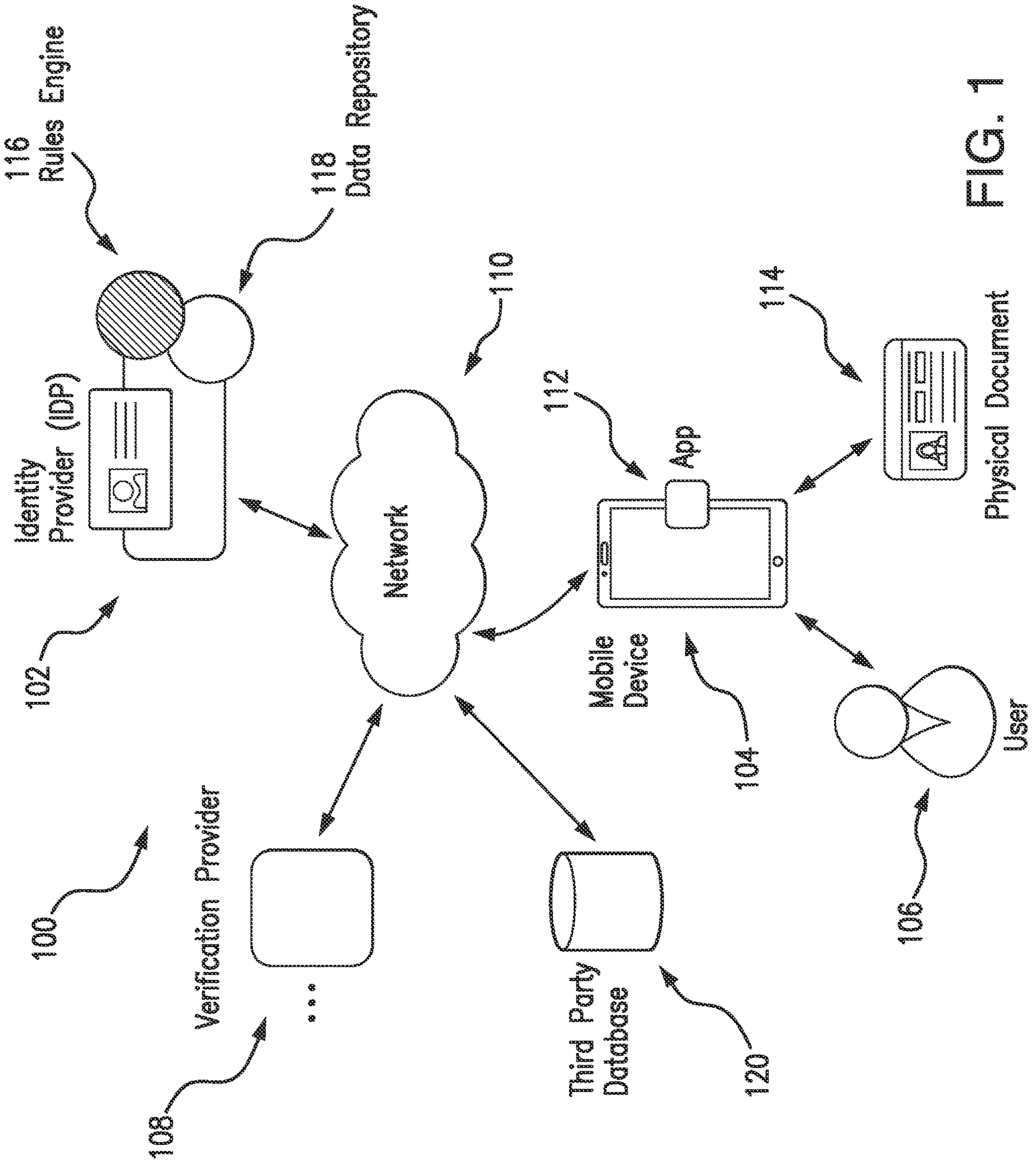
FIG. 1 illustrates an example system of the present disclosure suitable for use in altering attributes of user identities associated with networks.
Figure 3:
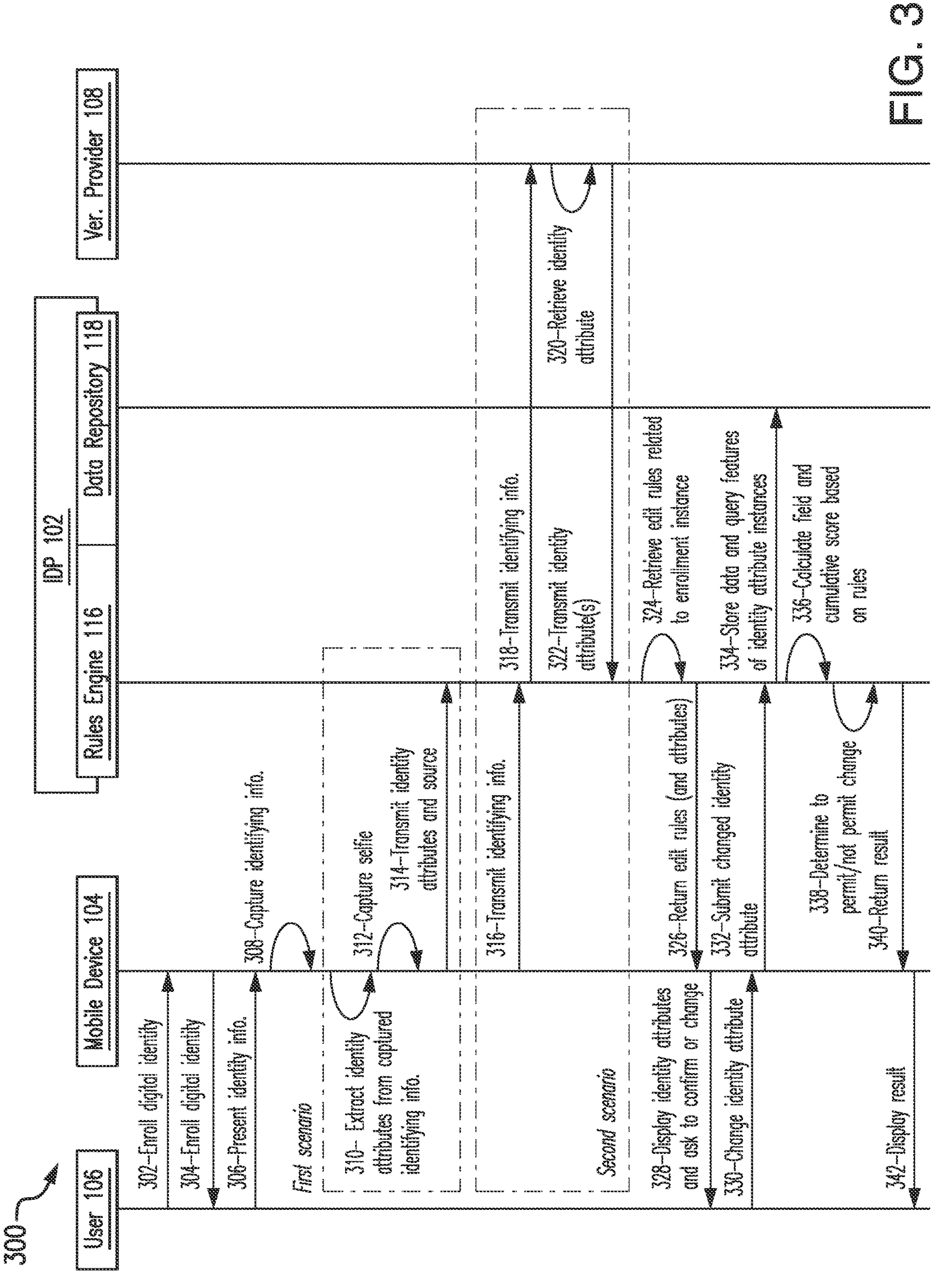
Figure 4:
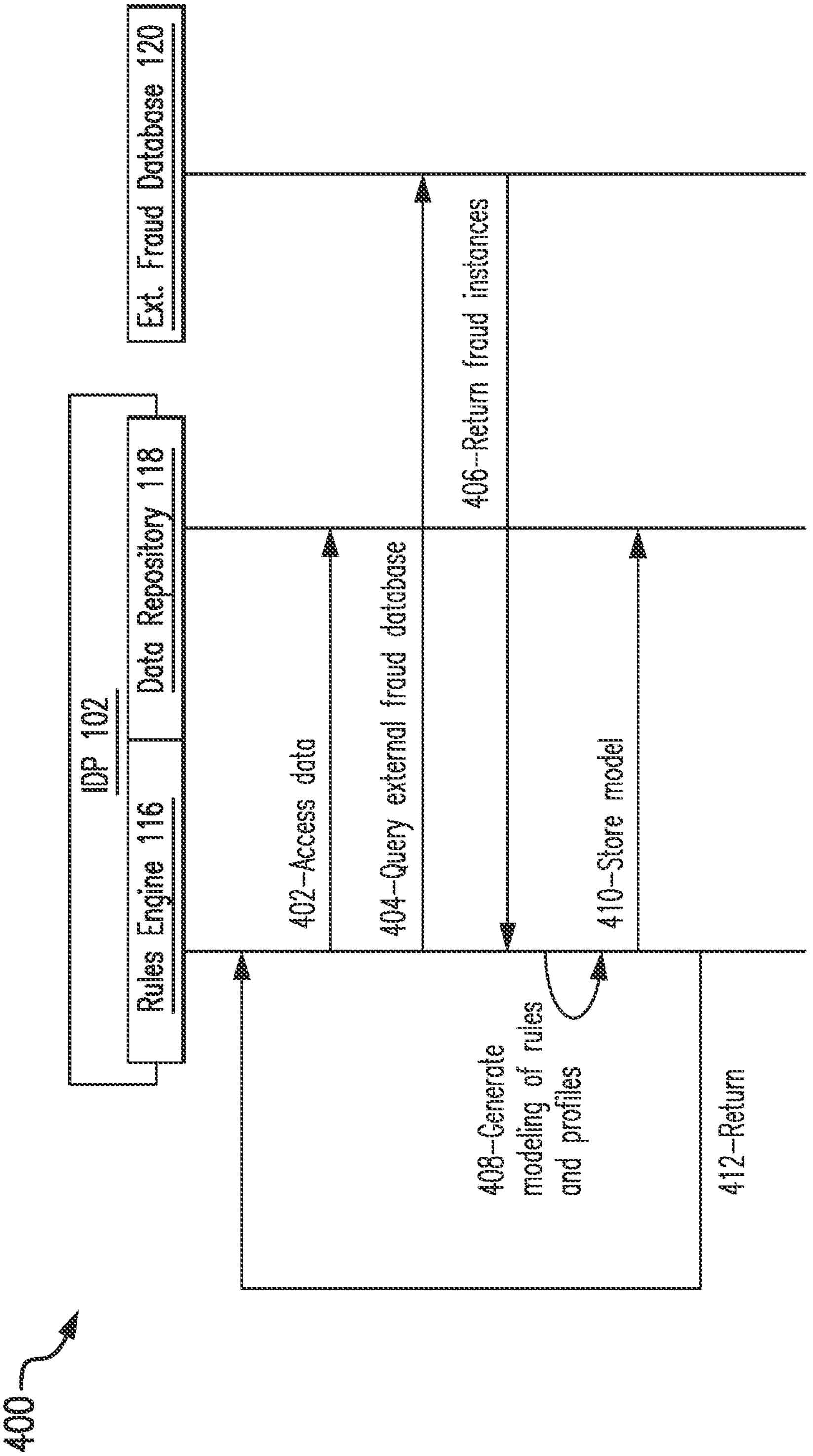

FIG. 3 illustrates an example method, which may be implemented in connection with the system of FIG. 1, for use in altering attributes of user identities, and in connection therewith, application of limited rules for altering the respective attributes; and FIG. 4 illustrates an example method, which may be implemented in connection with the system of FIG. 1, for use in modeling one or more rules associated with permitted alternations of attributes.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

Users are often associated with identities, to which the users are authenticated in connection with various activities, such as, for example, requesting or directing services (e.g., healthcare services, travel services, telecommunication services, etc.), establishing accounts (e.g., bank accounts, retirement accounts, email accounts, etc.), etc. The identities may be verified in various manners, including by scanning or otherwise evaluating physical identifying documents (e.g., driver's licenses, passports, other government ID cards, etc.), etc. When the scanning of the physical documents injects errors into the attributes of the user's identity, limited options exist to correct the errors whereby verification of the identity and/or provisioning of identities for the user may fail.

Uniquely, the systems and methods herein permit attributes of identities, as provided from third parties, to be altered by users. In particular, when an identity is presented, either from a physical document issued by a third party, or directly from the third party, the identity may include errors (e.g., based on extraction errors, use of nicknames or abbreviations, transposed characters, formatting errors, etc.). By modeling requested changes to errors in attributes (and/or associated data (e.g., source type, third party, extraction type, etc.)), a rules engine is able to identify and adapt edit rules for attributes, which permit legitimate alterations to the attributes, while inhibiting illegitimate alternations to the attributes (in connection with identity theft, for example). In this manner, when the user presents evidence of identity attributes, either through a physical document or otherwise, the user is then permitted to alter the attributes from the evidence consistent with the rules (e.g., to correct errors, etc.). As such, the systems and methods herein derivate from the conventional verification process by modeling the edit rules to the historical data related to alterations of attributes. This permits, among other things, the systems and methods herein to realize issues associated with the presentment of evidence not yet appreciated by human operators, etc. The systems and methods herein, then, are permitted to learn rules and optimize the presentment and alteration of identity attributes.

FIG. 1 illustrates an example system 100 in which one or more aspects of the present disclosure may be implemented. Although the system 100 is presented in one arrangement, other embodiments may include the parts of the system 100 (or other parts) arranged otherwise depending on, for example, relationships between users, platforms for identity services and third party databases, privacy concerns and/or requirements, etc.

The illustrated system 100 generally includes an identity provider (IDP) 102, a mobile device 104 associated with a user 106, and a verification provider 108, each of which is coupled to network 110. The network 110 may include, without limitation, one or more of a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. Further, in various implementations, the network 110 may include multiple different networks, where one or more of the multiple different networks are then accessible to particular ones of the IDP 102, the mobile device 104 and the verification provider 108, etc.

The IDP 102 in the system 100 generally is associated with forming and/or managing digital identities associated with users (e.g., the user 106, etc.). In connection therewith, the IDP 102 is configured to participate in registering, provisioning, and storing (in secure memory) identity information (or attributes) associated with the users, which may then be provided to one or more relying parties upon approval by the corresponding users. As such, the IDP 102 is configured to employ various techniques to verify and/or review identifying information associated with a user, prior to storing the identifying information and/or provisioning a digital identity for the user. Consequently, when the identifying information is provided to the relying party, for example, from the IDP 102, the relying party is permitted to trust the identifying information received for the user, thereby relying on the provisioning processes of the IDP 102.

The mobile device 104 in the illustrated system 100 includes a portable mobile device such as, for example, a tablet, a smartphone, a personal computer, etc. What's more, the mobile device 104 also includes a network-based application 112, which configures the mobile device 104 to communicate with the IDP 102. In the illustrated embodiment, the application 112 is provided by and/or associated with the IDP 102, as a standalone application. Alternatively, the application 112 may be provided as a software development kit (SDK) for integration in another application with one or more different purposes (e.g., as part of a financial application, an email application, a social-network application, a telecommunication application, a health application, etc.), whereby the SDK is provided by and/or associated with the IDP 102 and configures the mobile device 104 to interact with the IDP 102.

In addition, the user 106 is associated with an identity. The identity may include, without limitation, one or more different attributes such as: a name, a pseudonym, a mailing address, a billing address, an email address, a government ID number, a phone number, a date of birth (DOB), a place of birth, a biometric (e.g., a facial image, etc.), gender, age, eye color, height, weight, hair color, account number(s), insurance identifier(s), an employee identifier, and/or other information sufficient to distinguish, alone or in combination, the user 106 from other users, etc.

In connection therewith, the identity of the user 106 may be evidenced by one or more physical documents (e.g., a federal government document (e.g., a passport, a social security card, etc.), a banking institution document, an insurance provider document, a telecommunication provider document (e.g., from a mobile network operator (or MNO), etc.), a state or local government document (e.g., from a department of motor vehicles (or DMV), etc.), or other identity authority, etc.). In FIG. 1, an example physical document 114 associated with the user 106 is illustrated as a driver's license issued by the state in which the user 106 resides. Other physical documents may include, without limitation, a passport (e.g., NFC-enabled, or not, etc.), a credit card, an insurance card, a utility bill, another government ID card, etc. It should be appreciated that each of the physical documents may be region specific and may also include an identification of the issuer thereof (e.g., U.S. passport, a German passport, a Ney York driver's license, a Victoria, Australia driver's license, etc.).

Various different verification providers, including the verification provider 108, may issue the physical documents as evidence of the user's identity, as known by the specific verification provider. Based on the above, the verification provider 108 may include a company, a business or other entity through which information about users is retrieved, verified or provided, etc. For example, the verification provider 108 may include, without limitation, a banking institution, an employer, a government agency, or a service provider (e.g., an insurance provider, a telecommunication provider, a utility provider, etc.), etc. It should be appreciated that, despite the specific examples above, the verification provider 108 may include any user, entity or party, which is configured to provide identity information to the IDP 102, directly or via the application 112, etc.

In general, the verification provider 108 is configured to store a profile or account associated with the user 106, which includes various attributes of the user's identity. The verification provider 108 may be configured to, for example, issue a physical document to the user 106, as evidence of the attributes (e.g., the physical document 114, etc.). It should be appreciated that the verification provider 108 may also be configured to communicate identity attributes to the IDP 102, upon request from the IDP 102, as described in more detail below. In connection therewith, in one example, the verification provider 108 may be configured to expose an application programing interface (API) to be called by the IDP 102, which may permit attributes to be requested upon, for example, verification of the request and/or appropriate permissions, verification of the IDP 102, and/or authentication and/or authorization of the user 106, etc. That said, the verification provider 108 and/or the IDP 102 may be configured consistent with other techniques to provide communication therebetween, etc.

While only one specific verification provider 108 is represented in the system 100, the ellipsis included in FIG. 1 is provided to expressly indicates that, in general, multiple verification providers (as described above) will be included in various system embodiments. Only one verification provider 108 is shown here for purposes of clarity.

In addition, while only one IDP 102 and one mobile device 104 are illustrated in the system 100, it should be appreciated that additional ones of these parts/parties may be included in other system embodiments. Specifically, for example, it should be appreciated that other system embodiment will include multiple other users and multiple other verification providers, etc.

Figure 2:
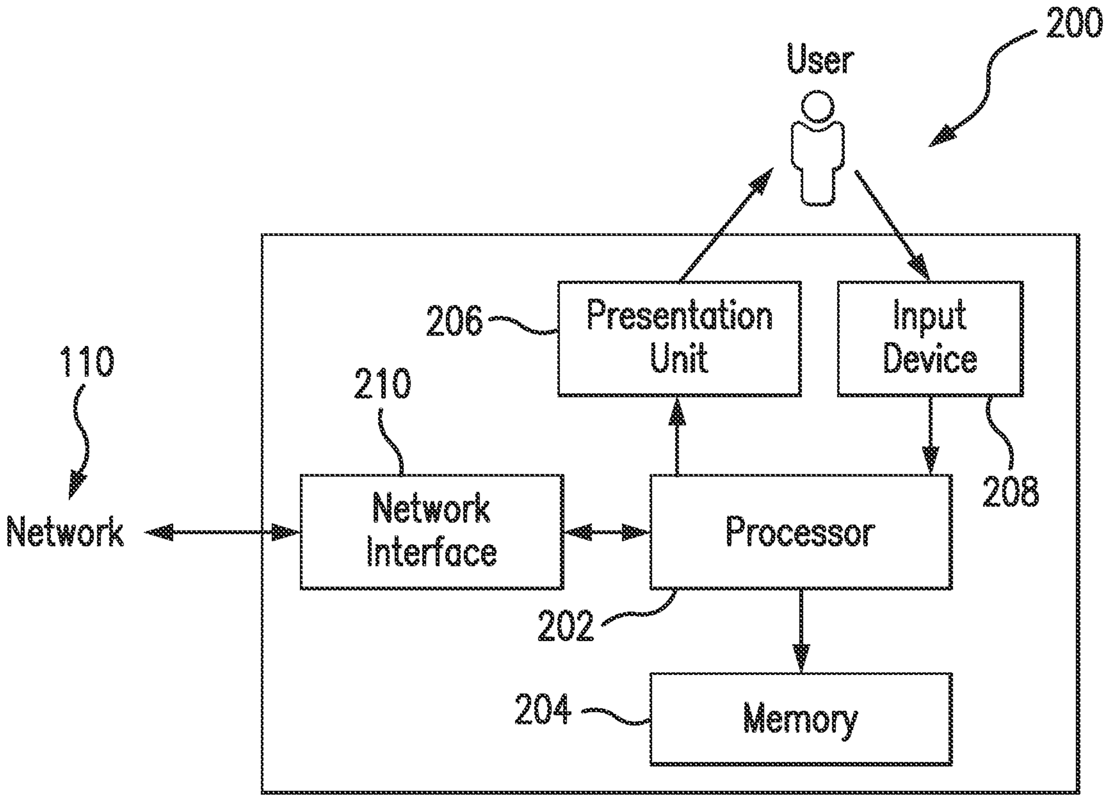
FIG. 2 is a block diagram of a computing device that may be used in the example system of FIG. 1.

FIG. 2 illustrates an example computing device 200 that can be used in the system 100 of FIG. 1. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein. In the example embodiment of FIG. 1, each of the IDP 102, the mobile device 104 and the verification provider 108 may be considered, may include, and/or may be implemented in a computing device consistent with the computing device 200, coupled to (and in communication with) the network 110. However, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the example computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, identity information, identity attributes, edit rules, historical change data for attributes, behavior and/or fraud instances, user profiles and/or accounts, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein (e.g., one or more of the operations of method 300, method 400, etc.), whereby upon (or in connection with) performing such operation(s) the computing device 200 may be transformed into a special purpose computing device. It should be appreciated that the memory 204 may include a variety of different memories, each implemented in one or more of the functions or processes described herein.

In the example embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information, visually or audibly, for example, to a user of the computing device 200 (e.g., identity attributes, requests to verify/change attributes, etc.), etc. And, various interfaces (e.g., as defined by the application 112, etc.) may be displayed at computing device 200, and in particular at presentation unit 206, to display certain information in connection therewith. The presentation unit 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

In addition, the computing device 200 includes an input device 208 that receives inputs from the user (i.e., user inputs) of the computing device 200 such as, for example, changes to identity attributes, etc., as further described below. The input device 208 may include a single input device or multiple input devices. The input device 208 is coupled to (and is in communication with) the processor 202 and may include, for example, one or more of a keyboard, a pointing device, a mouse, a camera, a touch sensitive panel (e.g., a touch pad or a touch screen, etc.), another computing device, and/or an audio input device. In various example embodiments, a touch screen, such as that included in a tablet, a smartphone, or similar device, may behave as both the presentation unit 206 and the input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., an NFC adapter, a Bluetooth™ adapter, etc.), a mobile network adapter, a near-filed communication (NFC) device or adapter, a RFID adapter, or a Bluetooth™ adapter, or other device capable of communicating to one or more different networks herein (e.g., network 110, etc.) and/or with other devices described herein. Further, in some example embodiments, the computing device 200 may include the processor 202 and one or more network interfaces incorporated into or with the processor 202.

Referring again to FIG. 1, as shown, the IDP 102 includes a rules engine 116 and a data repository 118 coupled to the rules engine 116. The rules engine 116 is a computing device, which may be consistent with the computing device 200, and which includes executable instructions, which when executed, cause the rules engine 116 (or more generally, the IDP 102) to perform one or more of the operations described herein. The data repository 118 includes one or more data structures, which include data described herein. While the rules engine 116 and the data repository 118 are illustrated as included in the IDP 102, it should be appreciated that one or both may be separate from the IDP 102, in whole or in part, in other embodiments.

The system 100 also includes a third party (or external) database 120, which may include different fraud or behavior instances. For a fraud instance, for example, the database 120 may include the detail of the sequence of events and/or attribute changes, etc., that existed in connection with a confirmed fraudulent act. In other words, the fraud instance generally provides a profile of the fraudulent act. Likewise, the behavior instance may include the details of a sequence of events and/or attributes changed, that exist in connection with a confirmed proper change of an identity attribute. Again, the behavior instance is a profile of a legitimate change. The rules engine 116 may be configured to request fraud and/or behavior instances from the third party database 120, and in turn, the third party database 120 is configured to return the requested data indicative of the instances.

In this example embodiment, the IDP 102 is configured to provision one or more identity attributes of a user's identity to a new or existing digital identity. The attribute(s) may be received from a source, such as, for example, the physical document 114 and/or the verification provider 108, etc. That said, the IDP 102 is further configured to permit users to alter one or more identity attributes as received from the source, depending on the particular instances (e.g., to correct an error, etc.).

In connection therewith, it should be understood that the data repository 118 includes one or more edit rules defining instances upon which users are permitted to change attributes of their identity, as captured from the physical document 114 and/or the verification provider 108. The edit rules will generally be granular in nature, for example, relating to particular edits such as: edits that make little or no material change to a claimed identity (e.g., altering an address to a colloquial naming (e.g., "Street" or "Avenue", etc.) without impacting a unique property reference such as a building number and zip code, etc.); common OCR errors (e.g., correct a captured character from "B" to "13" or vice versa, etc.); data contained within zones in specific documents where security features (e.g., holograms, overprinting, etc.) are known to obfuscate data (e.g., on Driver's Licenses issued in Victoria, AU, where characters 51-58 within the address line are subject to glare due to security features, etc.); or where changes made to data obtained by OCR from a physical document can be checked with an issuing source electronically so that any invalid change may cause a failure; etc. In addition, in some example embodiments, the edit rules may each include a weighting (e.g., a risk score, etc.) associated therewith, based on a severity, etc. of the change to the user's identity, whereby the weighting may then be used to build an overall risk score relating to the desired edit (based on application of one or more of the edit rules and corresponding weightings). In this way, the edits rules may contribute to risk and/or mitigation scoring for the requested edit/change.

That said, Table 1 below illustrates a number of example rules that may be included in the data repository 118.

TABLE 1

| Rule | Circumstance | Permitted Changes |
|---|---|---|
| 1 | OCR extraction from Driver's License or Passport with selfie verification | Change 2 characters in date of birth (DOB), 2 characters in document ID, 3 characters in name, unlimited address edits, plus a limit of 5 characters changed in total in DOB, document ID and name. |
| 2 | NFC extraction from passport with selfie verification | Change 2 characters in name, unlimited changes in address, no change to DOB or document ID |
| 3 | Attribute(s) from verification provider 108 | Change 2 characters in name, 5 characters in address, no change to DOB |
| 4 | User 106 adds additional evidence to identity (e.g., change last name to account for marriage or divorce, etc.) | Change name of user 106 based on a presented Passport, after a Driver's License of the user 106 is verified |
| . . . | . . . | . . . |

As shown, the example edit rules relate to the instances of the changes, as defined by a change request, per field (e.g., name, address, etc.), a type of extraction of the attributes (e.g., OCR, NFC, manual entry, etc.), a type of the evidentiary source (e.g., a physical document, a verification provider, etc.), etc. It should be appreciated that the rules included in Table 1 are for purposes of illustration only and should not be understood to be exhaustive of all rules or all instances in which the edit rules would apply to changes to one or more attribute(s), prior to, or after, provisioning the attributes to digital identities of users.

In addition, the data repository 118 also includes data from mobile devices, which indicate changes to attributes permitted by the rules above, and changes to attributes rejected by the rules above. For example, when an extracted physical address from a driver's license is 926 Main St., and the changed physical address is 928 Main St., or where the extracted physical address is 125 Bane Ave., the changed physical address is 125 Dane Ave., the data repository 118 may include both the original data and the changed data, or optionally, may include a log of the change (i.e., character change of 6 to 8, character B changed to character D). In other examples, the data repository 118 may include changes in names, such as, for example, Charlie to Charles, or Rich to Richard, and common format changes (e.g., date as MM/DD/YY changed to DD/MM/YY, etc.), etc. The data repository 118 may also include, without limitation, data specific to the users, including the user 106, etc., indicative of the mobile device 104 (e.g., device type, geolocation, travel patterns, device ID, ESN, application ID, etc.), etc. The data specific to the user 106, for example, may form a user profile in the data repository 118, which may be associated with the user 106 based on the device ID or other suitable data.

It should further be appreciated that the rules engine 116 is configured to employ artificial intelligence and/or machine learning to model rules based on the changes to the attributes (e.g., when changes are permitted, when changes are rejected, etc.) and potentially other data, such as, for example, the fraud and behavior instances, the user profile, number of retries, etc. In connection therewith, the rules engine 116 may be configured to model (and even apply) rules based upon, for example: a source of the attributes, such as its type (e.g., Driver's License, Passport, Credit Bureau data, etc.), its issuer (e.g., U.S. Department of State, Department of Motor Vehicles, etc.), and its characteristics (e.g., how long since issued, how long until expiry, etc.); the presentation of the data (e.g., OCR, NFC, electronic transfer, manual entry, etc.); characteristics of the user associated with the identity being edited (e.g., behavioral biometrics, age, etc.); characteristics of the device of the user associated with the identity being edited (e.g., location data (current, past, etc.), IP address, etc.); other attributes of the user associated with the identity being edited (e.g., email address, mobile number, etc.); or combinations thereof; etc. Additional rules may also be derived by the rules engine 116 based on changes commonly made, for example, correcting the character "B" to the character "13" as part of OCR, etc. Thereafter, the rules engine 116 is configured to impose new edit rules, or changes to the edit rules, based on the modelling, as stored in the data repository 118 for use as described below.

In view of the above, and in this example embodiment, when the user 106 desires to enroll one or more identity attribute(s) (e.g., name, mailing address, email address, date of birth, government ID number, etc.), the user 106 accesses the application 112, at the mobile device 104. In turn, the mobile device 104, as configured by the application 112, solicits identifying information from the user 106, for example, in the form of a physical document source (e.g., the physical document 114, etc.) or a verification provider source (e.g., the verification provider 108, etc.). The user 106, in response, presents the identifying information, via the source, to the mobile device 104 (e.g., by presenting the physical document 114 or identifying the verification provider 108, etc.).

When the source of the attribute(s) is the verification provider 108, the mobile device 104, as configured by the application 112, transmits the identifying information to the IDP 102. The identifying information, in this example, includes a description of the attributes and the identified source of the attribute(s). In response, IDP 102 is configured to request the identity attributes from the verification provider 108, as identified in the identifying information, whereupon the verification provider 108 is configured to return the identity attributes to the IDP 102, and the IDP 102 is configured to return the identity attributes to the mobile device 104.

When the source of the attribute(s) is the physical document 114, for example, the user 106 presents the physical document 114 (e.g., driver's license, passport, credit card, employer ID, insurance card, government ID card, etc.) to the mobile device 104 and also may provide an input (e.g., indicate the presence of the physical document 114, etc.). In response, the mobile device 104, as configured by the application 112, captures the attribute(s) from the physical document 114. In one example. the mobile device 104 captures, via a camera input device of the mobile device 104, an image of the physical document 114. In another example, the mobile device 104 reads, via a network adaptor (e.g., a NFC adapter, etc.), data from the physical document 14, when NFC enabled. In one or both examples, the mobile device 104, as configured by the application 112, may also capture an image of the user 106 (e.g., a selfie, etc.).

The mobile device 104, as configured by the application 112, then may extract the identity attribute(s) from the image (as needed) (e.g., name, address, government ID number, date of birth, expiration date, facial image, etc.), and further, optionally, validate the data. This may include comparing the image from the document 114 and the selfie of the user 106, whereby the user 106 is verified/authenticated, when there is a match, and/or comparing the expiration date to a current date, whereby the physical document 114 is confirmed to be valid (or expired).

In response thereto, or based on the identity attributes from the verification provider 108 (or the physical document 114), the mobile device 104, as configured by the application 112, displays the identity attribute(s) to the user 106 and to request that the user 106 confirm or change the attributes. The mobile device 104, as configured by the application 112, then receives the change(s) to the identity attribute(s) and returns the change(s) along with the original identity attributes to the IDP 102 (and specifically, the rules engine 116). The mobile device 104, as configured by the application 112, also provides the source of the identity attributes, the type of extraction, and potentially, data associated with the mobile device 104 (e.g., location data, etc.), to the IDP 102.

In turn, based on the identity attribute(s) and the source, the rules engine 116 is configured to retrieve the edit rules for the identity attribute(s) (and the source and the extract type) from the data repository 118. The rules engine 116 is configured to apply the edit rules and to determine whether to permit or reject the change(s) based on, at least the edit rule(s) (or scores provided thereby). If permitted, the rules engine 116 is configured to accept the identity attribute(s), as changed, for the user 106 and store the same as part of the digital identity of the user 106 (e.g., in a blockchain, or other data structure, etc.). Further, the rules engine 116 is configured to notify the mobile device 104 of the result, whether permitted or rejected. The mobile device 104, as configured by the application 112, then displays the result to the user 106.

FIG. 3 illustrates an example method 300 for use in permitting changes to attributes of an identity based on the circumstances associated with the attribute and/or for use in provisioning the attribute to the user's identity. The example method 300 is described as implemented in system 100, with reference to the IDP 102, and, specifically, the rules engine 116 and the data repository 118, and with additional reference to the computing device 200. However, the methods herein should not be understood to be limited to the system 100 or the computing device 200, as the methods may be implemented in other systems and/or computing devices. Likewise, the systems and the computing devices herein should not be understood to be limited to the example method 300.

Initially, the user 106 decides to enroll, at 302, at least one identity attribute with the IDP 102 (e.g., as part of a digital identity for the user 106, etc.). For example, the user 106 may decide to enroll the user's name, mailing address, date of birth, government ID number, biometrics, account number, etc., to a digital identity with the IDP 102 (e.g., for later presentation to a relying party as evidence on the user's identity, etc.). In connection therewith, the user cooperates with the IDP to provide evidence of the at least one identity attribute.

In connection with the above, the user 106 accesses the mobile device 104, and accesses the application 112 at the mobile device 104. The user 106 then selects to enroll an identity (e.g., as a digital identity, etc.), or at least an attribute of the user's identity (e.g., to an existing digital identity, etc.), with the IDP 102. The selection may include, for example, a selection of an "enroll" or "add attribute" or "add identity" or "add document" button or otherwise, etc.

In response, the mobile device 104 (through the application 112) solicits the identity information from the user 106, at 304. In general, in this example embodiment, the user 106 has the option to provide evidence of the identity directly, through a physical document (in a first scenario), for example, or to direct the IDP 102 to a verification provider 108 (in a second scenario).

In the first scenario, the mobile device 104 may present an interface to the user 106, with instructions to, for example, present a physical document, such as, for example, the physical document 114 to the mobile device. The physical document 114, as noted above, may include, without limitation, a driver's license, passport, credit card, employer ID, insurance card, other government ID card, etc. In connection therewith, the mobile device 104 may also solicit a type of the physical document 114, via the interface (e.g., U.S. passport, New York driver's license, Company A insurance card, etc.).

In the second scenario, the mobile device 104 may present an interface to the user 106, with an instruction to, for example, identify the verification provider 108. The verification provider 108 may be identified, for example, based on a name, number, selection (e.g., from a pull down of available verification providers, etc.), etc. The interface may also include an instruction to, for example, identify the particular attribute(s) to be provided (e.g., name, address, phone number, date of birth, government ID number, bank account number, etc.) and to provide an identifying information of the user 106 (e.g., username/password, account number, etc.).

In either scenario, at 306, the user 106 presents the identity information to the mobile device 104, which, again, may include the physical document 114, a type of the physical document 114 (broadly, a source), the identification of one or more attributes, the identification of the verification provider 108 (broadly, a source), identifying information for the user 106, etc. In response, the mobile device 104 captures the identifying information, at 308. This step may include, in the first scenario, capturing an image of the physical document 114, via a camera of the mobile device 104, and/or reading the identifying information form the document from the physical document 114 (e.g., when enabled for wireless communication, etc.), via a network adapter of the mobile device 104, etc. Additionally, or alternatively, this step may include, in the second scenario, receiving input as typed or otherwise inputted by the user 106 at an input device of the mobile device 104 (e.g., input device 208, etc.), etc.

In the first scenario, as designated by the dotted box in FIG. 3, the mobile device 104, then, extracts, at 310, one or more identity attributes from the identifying information of the physical document 114, including, specifically, as a captured image of the physical document 114. The identity attributes may include, as above, a name, address, phone number, email address, government ID number, DOB, account number, biometric etc. In addition, the mobile device 104, when not otherwise provided by the user 106, also extracts data related to the source of the attributes, i.e., the physical document 114. For example, the mobile device 104 may extract data indicating that the physical document 114 is from a specific jurisdiction (e.g., state, country, territory, etc.) or from a specific company or provider, etc. Other data related to the source is already known by the mobile device 104, such as, for example, the manner in which the identifying data was captured from the physical document 114 (e.g., image versus NFC, etc.).

The mobile device 104 also optionally captures, at 312, a facial image or selfie of the user 106. In connection therewith, while not shown, the mobile device 104 may extract an image of the user 106, from the identifying information (when it includes an image) and compare the captured facial image of the user 106 to the image included in the identifying data. When there is a match, the mobile device 104 may proceed (e.g., as the user 106 is authenticated, etc.), and when there is not match, the mobile device 104 (through the application 112) may terminate the enrollment. It should be appreciated that if the identifying information does not include an image of the user 106, authentication in this manner is not permitted, and other manners of authenticating the user 106 may be relied on (e.g., through the verification provider 108, based on access to the mobile device 104 (e.g., where biometric or PIN is required, etc.), etc.). Also, the validity of the physical document 114, based on the expiration date extracted from the physical document 114, etc., may be performed by the mobile device 104, in a similar manner (e.g., comparison of expiration date to a current date, etc.).

Thereafter, as shown in FIG. 3, the identity attributes and source data are transmitted, at 314, by the mobile device 104, to the IDP 102, and in particular, the rules engine 116.

In the second scenario, as designated by the dotted box in FIG. 3, the mobile device 104 transmits, at 316, the identifying information to the rules engine 116. The rules engine 116, in turn, transmits, at 318, the identifying information to the verification provider 108 (e.g., as a request for identity attributes, etc.).

The verification provider 108 receives the identifying information and then retrieves, at 320, one or more identity attributes for the user 106 based on the identifying information. For example, the identifying information may include a username and password, or account number, whereby the verification provider 108 is permitted to identify the user 106. It should be appreciated that prior to responding to the rules engine 116, the verification provider 108 may authenticate the request, either based on the content of the identifying information (e.g., a ESN of the mobile device 104, etc.), or directly with the user 106 (e.g., via a notification or message to the user 106 (e.g., at the mobile device 104, etc.), etc.). Regardless, in response, the verification provider 108 transmits, at 322, the identity attribute(s) back to the rules engine 116.

Thereafter, regardless of the scenario above, the rules engine 116 retrieves the edit rules for the enrollment instance, at 324. In particular, the rules engine 116 determines the edit rules based on the source of the identity attribute, the type of identity attribute, etc. The rules in Table 1, for example, may be retrieved in this example, when the physical document 114 is a driver's license and captured, at 308, as an image. It should be appreciated that other rules, based on the identity attributes and/or the source (e.g., manner of capture, etc.), etc., may be implemented in other embodiments.

Next, the rules engine 116 returns, at 326, the edit rules (along with the identity attribute(s) if received from the verification provider 108) to the mobile device 104. It should be appreciated that when the identity attributes are extracted from the physical document 114, for example, at the mobile device 104, the transmission of the identity attributes, at 314, and the return of the edit rules to the mobile device 104, at 326, may be omitted, and the rules engine 116 may retrieve the edits rules at a later point, including, for example, when the change to the identity attribute is submitted (e.g., at step 330, below, etc.).

With continued reference to FIG. 3, the mobile device 104 then displays the identity attribute(s) to the user 106, at 328, along with a solicit to confirm or change the identity attribute(s). The mobile device 104 also displays the edit rules to the user 106, thereby informing the user 106, or alternatively, may omit displaying the edit rules to the user 106. The user 106 is then permitted to review the identity attribute(s) and make changes as needed. In this example, the user 106 changes one of the identity attribute(s), at 330. The mobile device 104 then submits, at 332, the change in the identity attribute to the IDP 102, and specifically, the rules engine 116. The change may be accompanied by further data from the mobile device 104, including, without limitation, location data (e.g., latitude and longitude (presently or over a defined interval), etc.), device identity data, network connections data, etc.

The rules engine 116 stores, at 334, the changed attribute and/or the mobile device data in the data repository. The rules engine 116 may, optionally, apply the edit rules and permit the change if the change is consistent with the edit rules. In this example embodiment, also at 334, the rules engine 116 queries the data repository 118 for features of the identity attribute instance. The data repository 118 includes behavior patterns, in general, and specific to the user 106, and also includes historical fraud instances. The features of the identity attribute instance (e.g., location (current or prior interval), device identity (e.g., ESN or device ID of the mobile device 104, etc.), names and/or type of network connection to the mobile device 104, type of data and/or source (e.g., government, financial, social, etc.), etc.) are then compared to the user's profile from the data repository 118 and also the fraud instances from the data repository 118.

In connection therewith, the rules engine 116 calculates, at 336, field and/or cumulative scores based on the features and edit rules. In particular, for each field or attribute of the user's identity (e.g., name, address, DOB, etc.), the edit rules may permit a number of characters to be changed. For example, as shown in Table 1, a name field may be permitted to have two characters changed, while an address field may be permitted to have five characters changed. For each field or attribute, the rules engine 116 calculates a score based on the edit rules applied against the actions undertaken by the user 106 and the characteristics identified in the user's enrollment and subsequent request for edit(s). For example, if the user 106 requests a change to a date of birth on a Driver's License that resulted in crossing a threshold from an age under 21 to an age over 21, such a change would invoke an edit rule having a higher risk weighting than for a request to change a date of birth where such threshold is not crossed (e.g., where the original date of birth already indicated the user 106 is over age 21, etc.). In addition, across all attributes or fields, then, the rules engine 116 may also calculate a cumulative score, based on the number of total changes (e.g., a sum of field scores, a weighted combination of the filed scores, etc.).

In addition, the rules engine 116 may calculate a further score, or adjust the calculated field and/or cumulative risk score(s), based on one or more fraud/behavior instances retrieved from the data repository 118, and one or more of the behavior instances of the user 106, or the type or footprint of the mobile device 104, or the location of the mobile device 104, over time, or network connections of the mobile device 104 over an interval, or data associated with the verification provider 108 (e.g., footprint, duration of business, activity history, etc.), etc. In general, such further score may account for one or more circumstances (e.g., a mitigating circumstance, an escalating circumstance, etc.) associated with the requested change to the user's digital identity, whereby based on such circumstance(s) the calculated field risk score(s) and/or calculated cumulative risk score(s) may be increased or decreased. Such circumstances may include, for example, the extent of the specific changes being made, the attribute to which the changes are being made, the number of overall changes being made, the mode by which the changes are being made, supporting documentation provided with the requested changes, a location at which the changes are requested, a network involved in the change requests, a time or time interval associated with the request for change, etc.

As an example of such scoring (e.g., as performed at 336, etc.), the user 106 may request a change to a date of birth captured from his/he passport (e.g., at 330, etc.), from "5 Jul. 1965" to "5 Jun. 1965". In connection therewith, the rules engine 116 may apply Rule 1 from Table 1 (change one character in date of birth (DOB)). In doing so, the rules engine 116 may initially determine a threat or risk score for the change (based on a weighting for Rule 1) to be, for example, 10. The rules engine 116 then also determines one or more mitigation circumstances (and scores) for the change, for example, that the change involves only one character in the user's date of birth (e.g., mitigation score=2; etc.), that the change does not impact an age threshold (e.g., an age threshold of 21, another age threshold, etc.) for the user 106 (e.g., mitigation score=4; etc.), and the date of birth associated with the change was extracted from the user's passport via OCR (e.g., mitigation score=2; etc.). As such, in this example, the risk score is 10 and the total mitigation score is 7, whereby the field (or residual) risk score for the requested change to the user's date of birth is 3 (i.e., 10−7=3 in this example).

In another example, the user 106 may request a change to his/her first name on file in the user's digital identity, from "Alexander" to "Sandy", and a change to his/her address from 1 Example Way, Sheffield S11SW to 1 Example Way, Hillsborough Sheffield Si 1SW. In connection therewith, the rules engine 116 may apply Rule 4 from Table 1 to the requested name change and Rule 1 from Table 1 to the requested address change. In doing so, the rules engine 116 may determine a risk score for the name change (based on a weighting for Rule 4) to be, for example, 20 (because it involves an entire name change and not just a few characters, etc.). The rules engine 116 may then determine mitigation circumstances (and scores) for the change, for example, based on the change being from the current name to a known alias for the user 106 (e.g., as evidenced by other documentation on file for the user 106 or otherwise presented by the user 106 as part of the request, etc.) (e.g., mitigation score=15; etc.). As such, for the requested name change, the risk score is 20 and the mitigation score is 15, whereby the field (or residual) risk score is 5 (i.e., 20−15=5, in this example). Similarly, the rules engine 116 may determine a risk score for the address change (again, based on a weighting for Rule 1) to be, for example, 10. And, the rules engine 116 may then determine mitigation circumstances (and scores) for the change, for example, based on the change not materially altering the address (e.g., mitigation score=8; etc.). As such, for the requested address change, the risk score is 10 and the total mitigation score is 8, whereby the field (or residual) risk score is 2 (i.e., 10−8=2, in this example). Further in this example, the rules engine 116 may also combine the two field risk scores (for the name change and address change) to provide a cumulative risk score for the overall requested change, for example, of 7 (i.e., 5+2=7).

As shown in FIG. 3, after calculating (or generating) the field and/or cumulative risk scores, the rules engine 116 then determines, at 338, (based on the sore and/or compliance with the edit rules, generally) whether to permit the change or not permit the change requested by the user 106. If the change is permitted, the changed identity attribute is bound into the user' digital identity with the IDP 102 and stored in memory of the IDP 102 (e.g., as included in a blockchain data structure of the IDP 102, wherein the entry is specific to the user 106; etc.) (and/or at the mobile device 104). Regardless, the rules engine 116 returns a result, at 340, to the mobile device 104. In turn, the mobile device 104 displays, at 342, the result to the user 106.

In connection with the above, to determine whether to permit the change or not, the rules engine 116 may apply one or more thresholds to the resulting risk scores (be it to the field risk scores or the cumulative risk scores), for example, to determine whether the requested change(s) should be made to the user's identity or not. In doing so, the threshold (s) may be set based on the risk(s) identified and a balance of the residual risk(s) after mitigation. As such, if the resulting field risk score or cumulative risk score is greater than zero, the requested change(s) may be allowed. Otherwise, the requested change(s) may be declined. Alternatively, the threshold(s) may be set based on a total value of the risk score(s) (and a related scaling therefor) (be it the individual field risk scores or the cumulative risk scores). For instance, in the above example, if the cumulative risk score is greater than 10, then the requested edit(s) may be declined. Otherwise, the requested edit(s) may be made. It should be appreciated that such threshold(s) may be applied to each individual field risk score, whereby if an individual one of the field risk scores fails to satisfy the threshold(s), the particular edit(s) associated therewith may be declined (while other parts of the edit(s) may be allowed if their corresponding field risk score(s) satisfy the threshold(s)), or to the cumulative risk scores. In addition, in some examples the threshold(s) may also take into account one or more of the circumstances (described above) associated with the requested change to the user's digital identity, whereby the threshold may be increased or decreased based thereon (in a similar manner to the above description relating to the risk scores) (e.g., if the mobile device 104 is trusted and the user 106 has a long history of normal usage, a higher threshold may be used to allow changes to be accepted; etc.).

It should be appreciated that the physical document 114 and the verification provider 108 may be relied on in combination in another scenario. In such a scenario, both the first and second scenario in FIG. 3 are included, and then, there is a comparison of the identity attributes captured from the physical document 114 and received from the verification provider 108 (e.g., by the mobile device 104 and/or the rules engine 116, etc.). Consequently, the edit rules may be limited to identity attributes for which a difference exists between the two sources (e.g., a change up to two characters of an unmatched name, or a change in one character of an unmatched DOB, etc.), or not, or the score calculated from the edit rules may be altered accordingly.

FIG. 4 illustrates an example method 400 for use in modeling edit rules for identity attributes. The example method 400 is described as implemented in system 100, with reference to the rules engine 116 and the data repository 118, and with additional reference to the computing device 200. However, the methods herein should not be understood to be limited to the system 100 or the computing device 200, as the methods may be implemented in other systems and/or computing devices. Likewise, the systems and the computing devices herein should not be understood to be limited to the example method 400.

At the outset, in method 400, the rules engine 116 accesses, at 402, data from the data repository 118, and in particular, data related to changes in identity attributes. The data includes, initially, original identity attributes and changed identity attributes, and the associated sources and, when relevant, rules violations. For example, when a user attempts to change more than eight characters of an address of a Victoria driver's license, when only five character changes are permitted, the rules violation is accessed, along with the source, i.e., Victoria driver's license.

In addition, the behavior data and fraud data from the data repository are also accessed. The behavior data may be specific to a user, or generic to many users. The fraud data is indicative of instances, which were confirmed to be fraudulent. Also, as shown in FIG. 4, the rules engine 116 queries, at 404, the external fraud database 120 for additional confirmed instances of fraudulent attempts to enroll false identity attributes and/or fraudulently changed identity attributes in connection with enrollment. The external fraud database 120 returns, at 406, the instances of fraud.

At 408, then, the rules engine 116 employs one or more machine learning and/or artificial intelligence techniques to model the accessed data, which results in an adaptation of the edit rules, the behavior data and/or the fraud data. This may include establishing the edit rules, establishing weightings for the edit rules, establishing mitigation and/or escalation values to be associated with the edit rules, and/or establishing thresholds for use in determining whether or not requested edits should be made (based on comparison to one or more scores established via the edit rules, etc.). In doing so, the rules engine 116 may, by way of the machine learning and/or artificial intelligence technique(s), tailor weighting on existing edit rules and identify new edit rules for both risk and mitigations/escalations. For example, the rules engine 116 may identify areas within a given evidentiary document (e.g., a Driver's License, a Passport, etc.) where there are, historically, more changes being made/requested by users (e.g., data included in portions of the document overlaying a hologram, etc.). And, as more users utilize the digital identity features herein, the rules engine 116 will develop a larger historical basis for such rules and identify certain trends in requested edits (be it with regard to particular documents, to particular document capture processes, to particular characters, etc.).

In the above example, related to the Victoria driver's license, the data repository 118 may include multiple rejected changes for the address from a Victoria driver's license, because of changes in excess of five characters for OCR's address from the driver's license. The model may associate an exception, or change the rule related to number of characters permitted to be changed for an address from a Victoria driver's license as the source. For example, the model may include a rule to permit nine character changes in the Victoria driver's license. Apart from the model, it is realized that the location of the address coincides with a hologram on the Victoria driver's license, which serves to obscure the address, to an extent, for OCR capture of the address. The model, by leveraging the data related to rejected changes is able to recognize the pattern and adapt the rule accordingly, without understanding the specific layout of the Victoria driver's license.

Next, at 410, the rules engine 116 stores the model in the data repository 118 (which may adapt the edit rules and/or the behavior/fraud data included therein) for later recall in connection with the method 300, for example.

Additionally, as shown in FIG. 4, the rules engine 116 returns, at 412, to the beginning of method 400, and repeats the method 400, starting again with step 402. In this manner, the model generated, at 408, is iterated at whatever interval is imposed upon step 412 (e.g., daily, weekly, monthly, or some other suitable interval, etc.), whereby the model evolves based on the available data.

In view of the above, the systems and methods herein provide for provisioning digital identities to users, wherein the users are permitted (subject to edit rules) to make changes to attributes captured during the provisioning process of digital identities. The edit rules are subjected to machine learning and/or artificial intelligence to improve the edit rules over time based on the data related to identity attributes. This is unique in that OCR data or other extracted data or captured data, when confirmed by the user, is often freely editable by the user. That is not true in the context of identity attributes, where the user may have illegitimate reasons to alter the identity attributes. As such, the edit rules herein provide permission, yet protection, and the modeling provides adaption of the same over time, as data associated with permitted and rejected changes evolves (along with fraud and/or behavior instances, in some embodiments, etc.).

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following operations: (a) receiving, at a computing device, from a mobile device, identification information associated with enrollment of at least one identity attribute of a user to a digital identity for the user, the identification information associated with a source; (b) determining at least one rule based on the at least one identity attribute and/or the source, the at least one rule associated with a change to the at least one identity attribute of the digital identity of the user based on a type of the at least one identity attribute and/or the source; (c) receiving, by the computing device, from the mobile device, a request for a change to the at least one identity attribute of the digital identity of the user; (d) determining, by the computing device, whether the change to the at least one identity attribute is consistent with the at least one rule; (e) effecting, by the computing device, the change to the at least one identity attribute, when the change is consistent with the at least one rule; and (f) rejecting, by the computing device, the change to the at least one identity attribute, when the change is inconsistent with the at least one rule.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in changing attributes associated with user identities, based on event driven rules, the method comprising:

generating, by a computing device of an identity provider, using a machine learning model, a plurality of rules, based on historical data representative of approved changes to identity attributes derived from physical documents, wherein a first one of the plurality of rules is generated, by the machine learning model, based on the historical data indicating repeated approved changes to at least one identity attribute due to a security feature being part of a first type of physical document and being physically positioned at a location of the at least one identity attribute on the first type of physical document, which therefore impedes extraction of the at least one identity attribute, the first one of the plurality of rules permitting a change to the at least one identity attribute when derived from the first type of physical document; and wherein the security feature includes one of a hologram and an overprinting; and receiving, at the computing device, from a mobile device of a user, a request related to a digital identity of the user, which includes i) identification information for the user captured at the mobile device from an image of a source physical document, the identification information including a value of the at least one identity attribute and an authentication result, based on comparison of the image of the source physical document and an image of the user captured by the mobile device and ii) a user change to the value of the at least one identity attribute;

retrieving, by the computing device, the first one of the plurality of rules;

determining, by the computing device, that the source document is the first type of physical document and the user change is limited to the value of the at least one identity attribute, which is consistent with the first one of the plurality of rules; and based on the determination and the authentication result:

effecting, by the computing device, the user change to the value of the at least one identity attribute; and storing, in a blockchain data structure of the identity provider, the changed value of the at least one identity attribute as part of the digital identity for the user in the blockchain data structure.

2. The computer-implemented method of claim 1, further comprising:

capturing, by the mobile device, the image of the source physical document;

extracting the value of the at least one identity attribute from the image of the source physical document;

receiving, at the mobile device, from the user, the user change to the value of the at least one attribute; and transmitting, by the mobile device, the user change to the value of the at least one identity attribute to the computing device.

3. The computer-implemented method of claim 1, wherein determining whether the change to the value of the at least one identity attribute is consistent with the first one of the plurality of rules includes:

generating at least one score for the change to the value of the at least one identity attribute; and comparing the at least one score for the change to the value to a defined threshold; and wherein effecting the change to the at least one identity attribute includes effecting the change in response to the at least one score satisfying the defined threshold.

4. The computer-implemented method of claim 3, wherein generating the at least one score includes generating at least one score relating to a circumstance associated with the at least one change.

5. The computer-implemented method of claim 4, wherein the at least one score relating to the circumstance associated with the at least one change is selected from a group consisting of a mitigation score and an escalation score.

6. A system for use in changing attributes associated with user identities, the system comprising:

an identity provider including a computing device, which includes a non-transitory memory, the computing device configured, by executable instruction included in the non-transitory memory, to:

generate, using a machine learning model, a plurality of rules, based on historical data representative of approved changes to identity attributes derived from physical documents, wherein a first one of the plurality of rules is generated, by the machine learning model, based on the historical data indicating repeated approved changes to at least one identity attribute due to a security feature being part of a first type of physical document and being physically positioned at a location of the at least one identity attribute on the first type of physical document, which therefore impedes extraction of the at least one identity attribute, the first one of the plurality of rules permitting a change to the at least one identity attribute when derived from the first type of physical document; and wherein the security feature includes one of a hologram and an overprinting; and receive, from a mobile device of a user, a request related to a digital identity of the user, which includes i) identification information for the user captured at the mobile device from an image of a source physical document, the identification information including a value of the at least one identity attribute and an authentication result, based on comparison of the image of the source physical document and an image of the user captured by the mobile device and ii) a user change to the value of the at least one identity attribute;

retrieve the first one of the plurality of rules;

determine whether the source document is the first type of physical document and the user change is limited to the value of the at least one identity attribute, which is consistent with the first one of the plurality of rules; and based on the source document being the first type of document and the user change being limited to the value of the at least one identity attribute, which is consistent with the first one of the plurality of rules and the authentication result:

effect the user change to the value of the at least one identity attribute; and store, in a blockchain data structure of the identity provider, the changed value of the at least one identity attribute as part of the digital identity for the user in the blockchain data structure.

7. The system of claim 6, wherein the feature of the physical document includes a hologram of the physical document.

8. The system of claim 6, wherein the computing device, in determining whether the change to the value of the at least one identity attribute is consistent with the first one of the plurality of rules includes, is configured to:

generate at least one score for the change to the value of the at least one identity attribute, based at least in part on the first one of the plurality of rules; and compare the at least one score for the change to the value to a defined threshold; and wherein the computing device, in effecting the change to the value of the at least one identity attribute, is configured to effect the change to the value in response to the at least one score satisfying the defined threshold.

* * * * *